United States Patent
Noh et al.

(10) Patent No.: US 10,863,437 B1
(45) Date of Patent: Dec. 8, 2020

(54) WIRELESS DEVICE LOW POWER WAKE UP

(71) Applicant: NEWRACOM, INC., Lake Forest, CA (US)

(72) Inventors: Yujin Noh, Lake Forest, CA (US); Minho Cheong, Lake Forest, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 16/112,513

(22) Filed: Aug. 24, 2018

Related U.S. Application Data

(60) Provisional application No. 62/552,281, filed on Aug. 30, 2017.

(51) Int. Cl.
*H04W 52/02* (2009.01)
*H04L 27/26* (2006.01)
*H04L 27/02* (2006.01)
*H04B 7/0452* (2017.01)
*H04W 84/12* (2009.01)

(52) U.S. Cl.
CPC ...... *H04W 52/0235* (2013.01); *H04B 7/0452* (2013.01); *H04L 27/02* (2013.01); *H04L 27/2608* (2013.01); *H04L 27/2614* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2016/0381636 | A1* | 12/2016 | Park | H04W 52/0229 370/311 |
| 2017/0094600 | A1* | 3/2017 | Min | H04W 76/27 |
| 2017/0116138 | A1* | 4/2017 | Yang | G06F 13/102 |
| 2018/0132176 | A1* | 5/2018 | Abraham | H04L 43/087 |
| 2018/0205587 | A1* | 7/2018 | Xiang | H04L 5/0007 |
| 2019/0007904 | A1* | 1/2019 | Asterjadhi | H04W 52/0216 |

(Continued)

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Jenkey Van

(57) ABSTRACT

A first wireless device determines a function of a Wake-Up (WU) Packet, selects a length of the WU Packet from a predetermined set of lengths corresponding to the function, and generates the WU packet having the selected length. The WU packet includes a Legacy preamble having a first bandwidth and a WU payload having a second bandwidth less than and included within the first bandwidth. The WU payload including an indication of the function and a control indication usable to select the length from the predetermined set of lengths corresponding to the function. The first wireless device transmits the WU packet by transmitting the Legacy preamble on the first bandwidth and then transmitting the WU payload on the second bandwidth. A second wireless device receives the WU payload and determines a length of the WU packet using the indication of the function and the control information.

20 Claims, 10 Drawing Sheets

(56) References Cited

U.S. PATENT DOCUMENTS

| | | | |
|---|---|---|---|
| 2019/0028967 A1* | 1/2019 | Ahn | H04B 7/02 |
| 2019/0069231 A1* | 2/2019 | Kneckt | H04W 52/0235 |
| 2019/0246356 A1* | 8/2019 | Kim | H04L 27/02 |
| 2019/0281551 A1* | 9/2019 | Kim | H04W 52/02 |

OTHER PUBLICATIONS

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

* cited by examiner

FIG. 1
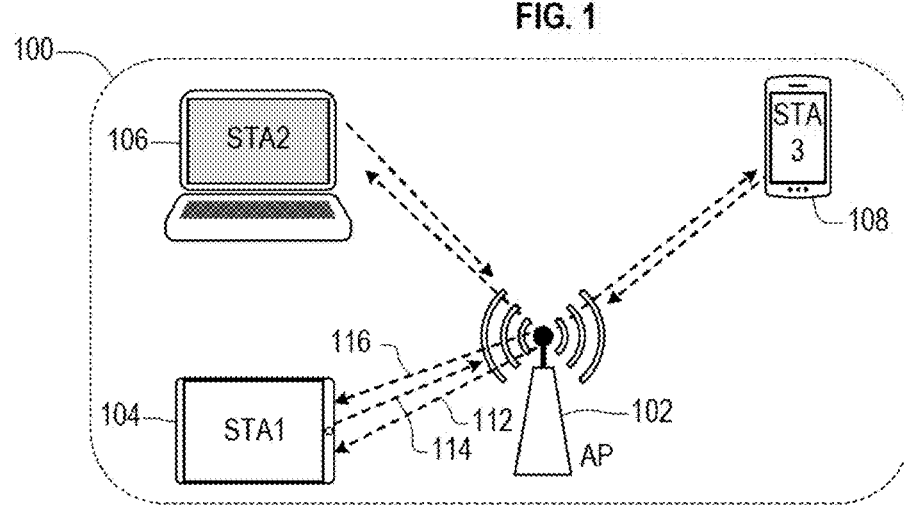
FIG. 2A
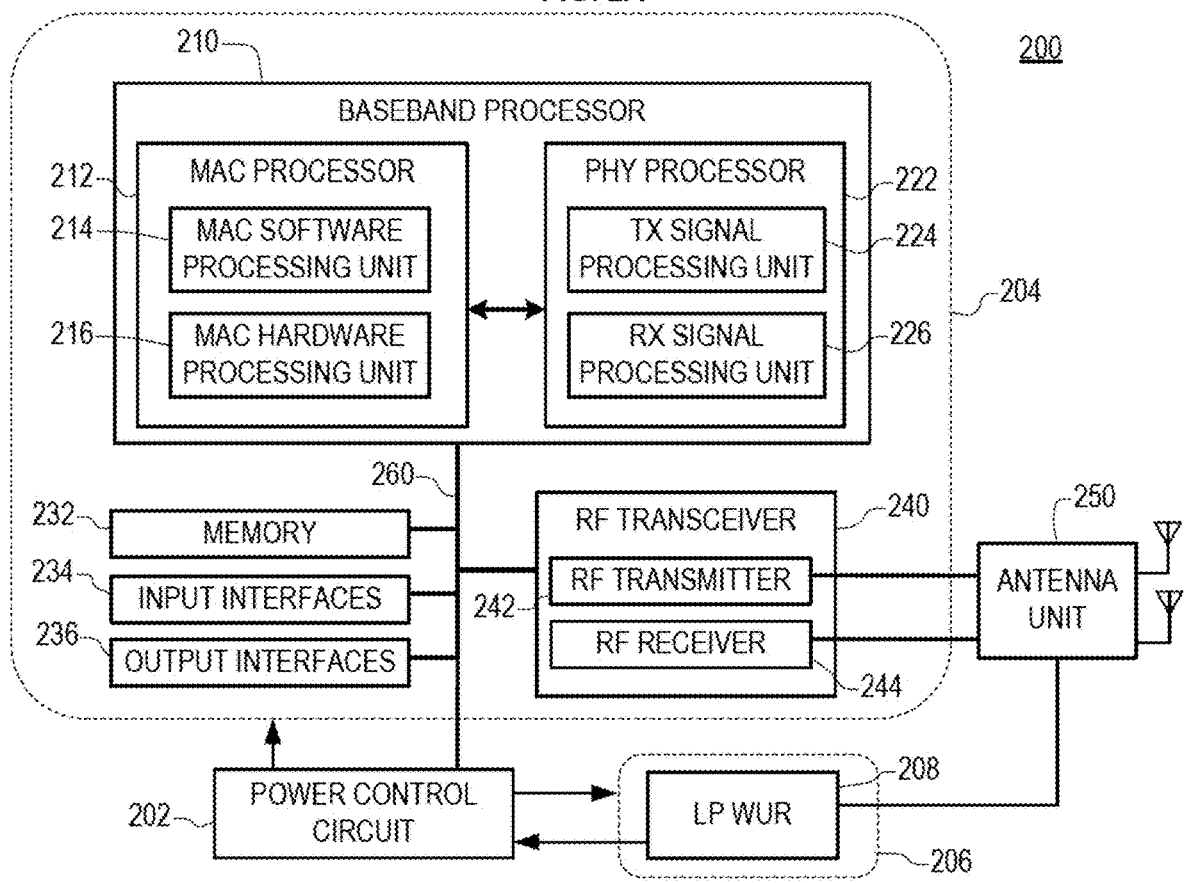
FIG. 2B
| STATE | First Power Domain 204 | Second Power Domain 206 |
|---|---|---|
| SLEEP | OFF (or Doze) | ON |
| WAKING UP | ON | ON |
| AWAKE | ON | OFF |
| PREPARING TO SLEEP | ON | ON |

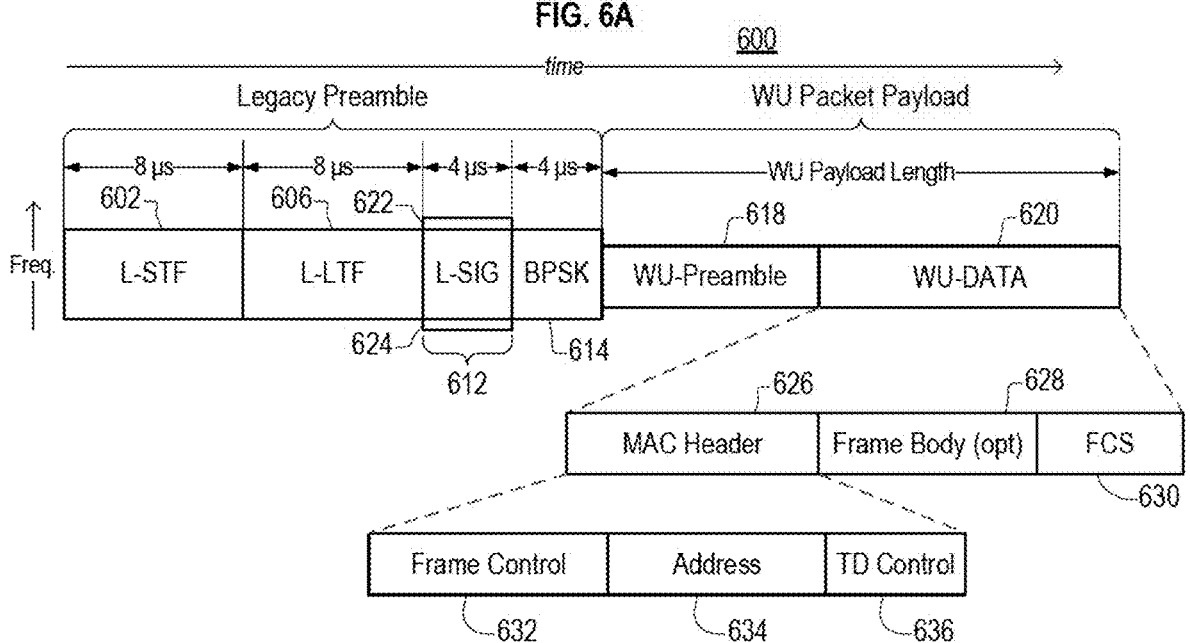

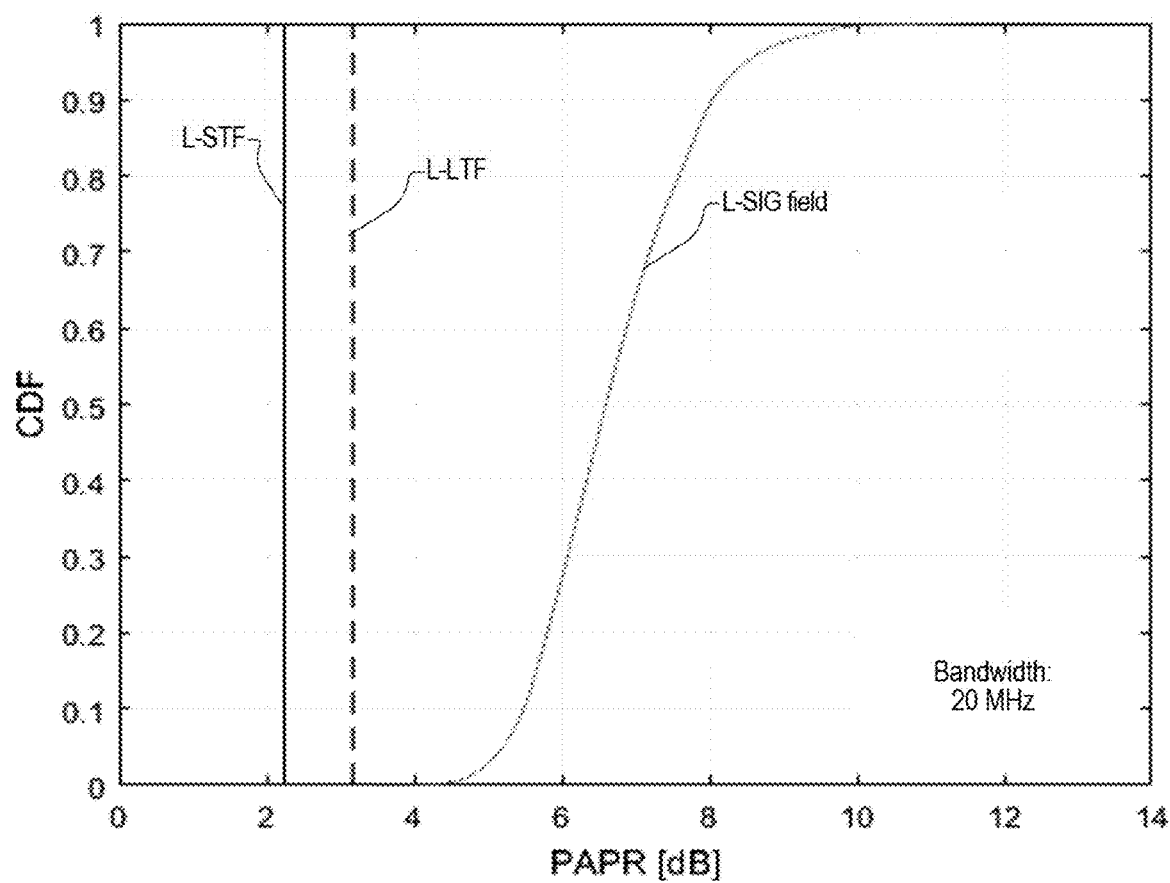

FIG. 11A

Table 1, part 1

FIG. 11B Table 1, part 2

FIG. 12
Table 2
| 13 bit seq including DC | | 13 bit seq excluding DC | |
|---|---|---|---|
| U | PAPR | U | PAPR |
| 7 | 3.646444 | 12 | 2.382855 |
| 3 | 3.721794 | 1 | 2.467412 |
| 6 | 3.806447 | 7 | 3.910683 |
| 10 | 3.898429 | 6 | 4.067061 |
| 12 | 4.377213 | 9 | 4.233018 |
| 1 | 4.593866 | 4 | 4.26883 |
| 5 | 5.129766 | 11 | 4.762016 |
| 8 | 5.155753 | 3 | 4.819591 |
| 11 | 5.476822 | 10 | 4.828071 |
| 2 | 5.63795 | 2 | 4.85754 |
| 4 | 5.858993 | 5 | 5.701102 |
| 9 | 5.91707 | 8 | 5.941728 |
FIG. 13
Table 3
k = 0, 1, ..., 12
| U | PAPR |
|---|---|
| 1 | 2.538176 |
| 2 | 4.717376 |
| 3 | 5.013789 |
| 4 | 4.140167 |
| 5 | 6.025256 |
| 6 | 4.067462 |
| 7 | 4.067462 |
| 8 | 6.025256 |
| 9 | 4.140167 |
| 10 | 5.013789 |
| 11 | 4.717376 |
| 12 | 2.538176 |
FIG. 14
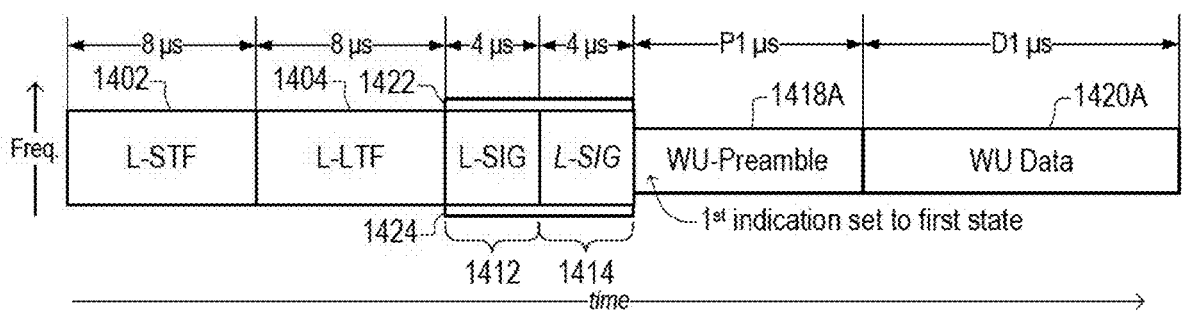
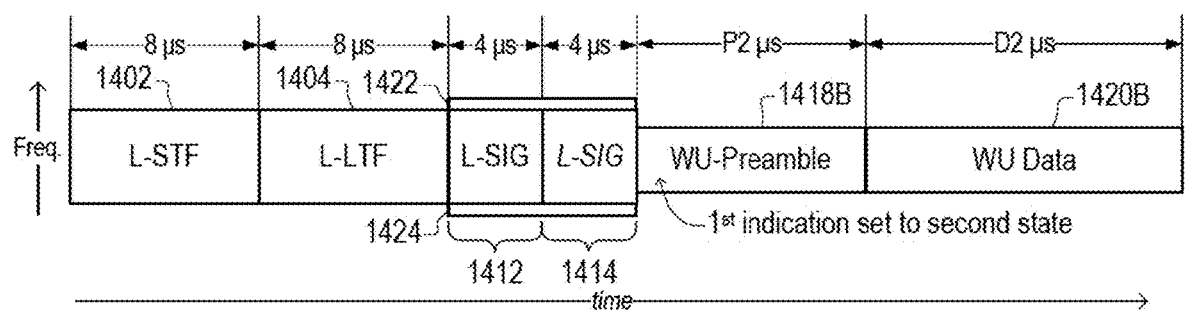

WIRELESS DEVICE LOW POWER WAKE UP

CROSS-REFERENCE TO RELATED APPLICATION

This application claims the benefit of U.S. Provisional Patent Application No. 62/552,281, filed Aug. 30, 2017, which is incorporated by reference herein in its entirety.

BACKGROUND

1. Technical Field

The technology described herein relates generally to wireless networking. More particularly, the technology relates to waking up a wireless local network device from a sleep mode.

2. Description of the Related Art

Wireless Local Area Network (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

In order to increase battery life, a device needs to sleep more. These longer sleep period results in increased latency because the device must be woken up before operations can be performed. To receive data with low latency, a device needs to sleep less, but sleeping less results in shorter battery life.

To resolve this trade-off between power consumption and data latency, a concept of low-power wake-up receiver was discussed in standardization of the IEEE 802.11 standard. IEEE Std 802.11ba relates to a companion radio for devices having main radio in accordance with other portions of the IEEE 802.11 standard. Conceptually, a communication device includes an IEEE 802.11 main radio and a low-power (LP) Wake-Up Receiver (WUR).

The main radio is used for user data transmission and reception. The main radio is turned off unless there is something to transmit or receive.

The LP-WUR operates to wake up the main radio when the LP-WUR receives an indication that there is a packet for the device to receive. Once LP-WUR wakes up the main radio, data is transmitted and received by the main radio.

The LP-WUR is not for user data transmission/reception, and therefore the LP-WUR may be a simple receiver and may not include a transmitter. Because the LP-WUR is likely to be active while the main radio (and the rest of the device) is in a sleep mode, it is desirable that the LP-WUR consume very little power. Accordingly, the design of LP-WUR may be simple, which permits power consumption of LP-WUR to be much lower than that of the main radio. For example, a LP-WUR may use less than 1001.1 W when active.

To achieve the goal of simplicity and low power consumption, transmissions intended for the LP-WUR may use a simple modulation schemes, such as On-Off-Keying (OOK). OOK is a simple form of Amplitude-Shift Keying (ASK) modulation in which a bit of digital data is indicated by the presence or absence of a carrier wave.

To provide better support for long range and low power (LRLP) transmission, the wake-up packets for the LP-WUR should have a low Peak-to-Average-Power Ratio (PAPR). Also, the length of the wake-up packets should be efficiently communicated to the LP-WUR.

SUMMARY

In an embodiment, a method performed by a wireless device comprises determining a function of a Wake-Up (WU) Packet, selecting a length of the WU Packet from a predetermined set of lengths corresponding to the function, and generating the WU packet having the selected length. The WU packet includes a Legacy preamble having a first bandwidth and a WU payload having a second bandwidth less than and included within the first bandwidth. The WU payload including an indication of the function and a control indication. The control indication can be used to select the length from the predetermined set of lengths corresponding to the function. The method further comprises transmitting the WU packet by transmitting the Legacy preamble on the first bandwidth and then transmitting the WU payload on the second bandwidth.

In an embodiment, the control indication indicates a number of specific information fields in the WU payload, and selecting the length of the WU Packet from the predetermined set of lengths corresponding to the function comprises selecting a first length from the predetermined set of lengths corresponding to the function in response to the control indication indicates a number of specific information fields less than or equal to a predetermined threshold value, and selecting a second length greater than the first length from the predetermined set of lengths corresponding to the function in response to the control indication indicates a number of specific information fields greater than a predetermined threshold value.

In an embodiment, the specific information fields include address fields.

In an embodiment, the specific information fields include receiver identifier fields.

In an embodiment, the method further comprises appending an additional field to each specific information field, the additional field indicating whether the corresponding specific information field is the last specific information field in the WU packet.

In an embodiment, the method further comprises determining a minimum length required to communicate the indicated number of specific information fields in the WU payload, and including in the WU payload one or more overhead fields in response to the minimum length being less than the selected length. The one or more overhead fields serve to maintain energy in the channel when the WU payload is transmitted.

In an embodiment, a value of an overhead field of the one or more overhead fields indicates that the overhead field is not assigned to a station.

In an embodiment, a value of an overhead field of the one or more overhead fields indicates that there are no specific information fields after the overhead field.

In an embodiment, generating the WU payload comprises generating a WU preamble, and generating a WU Data for transmission after the WU preamble. The WU Data includes a Media Access Control (MAC) header and a Frame Check Sum (FCS). The MAC header includes the indication of the function of the WU Packet.

In an embodiment, generating the WU Data comprises including a Frame Body between the MAC header and the FCS if and only if the control indication indicates that the number of specific information fields is greater than one.

In an embodiment, the WU preamble includes the control indication.

In an embodiment, the Legacy preamble includes a Legacy Short Training field (L-STF), a Legacy Long Training Field (L-LTF), and a Legacy Signal (L-SIG) Field, and the method further comprises transmitting a sequence for reducing a Peak-to-Average Power Ratio (PAPR) of the L-SIG field on one or more additional subcarriers of the first bandwidth, the additional subcarriers having index numbers outside the range of the index numbers of the subchannels used to transmit the L-SIG field.

In an embodiment, a method performed by a wireless device comprises receiving a Wake-Up (WU) payload included in a WU Packet. The WU packet including a Legacy preamble before the WU payload. The method further comprises determining from the WU payload a function of the WU Packet and a control indication, determining a length of the WU Packet by selecting, using the control indication, the length of the WU Packet from a predetermined set of lengths corresponding to the function of the WU Packet, and decoding, using the determined length of the WU packet, the WU payload. The Legacy preamble has a first bandwidth, and the WU payload has a second bandwidth less than and included within the first bandwidth.

In an embodiment, the control indication indicates a number of specific information fields in the WU payload, and selecting the length of the WU Packet from the predetermined set of lengths corresponding to the function comprises selecting a first length from the predetermined set of lengths corresponding to the function in response to the control indication indicates a number of specific information fields less than or equal to a predetermined threshold value, and selecting a second length greater than the first length from the predetermined set of lengths corresponding to the function in response to the control indication indicates a number of specific information fields greater than a predetermined threshold value.

In an embodiment, the specific information fields include address fields or receiver identifier fields.

In an embodiment, a corresponding additional field is appended to each specific information field in the WU payload, and the method further comprises determining, using an additional field of a specific information field, whether the specific information field is the last specific information field in the WU packet.

In an embodiment, the WU payload includes one or more overhead fields configured to maintain energy in the channel during the transmission of the WU payload.

In an embodiment, the method further comprises determining, using a value of an overhead field of the WU payload, that the overhead field is not assigned to a station or that there are no specific information fields after the overhead field.

In an embodiment, receiving the WU payload comprises receiving a WU preamble, and receiving a WU Data after receiving the WU preamble. The WU data includes a Media Access Control (MAC) header and a Frame Check Sum (FCS). The MAC header includes the indication of the function of the WU Packet.

In an embodiment, the WU preamble includes the control indication.

BRIEF DESCRIPTION OF THE DRAWINGS

FIG. 1 illustrates a wireless network according to an embodiment.

FIG. 2A is a schematic diagram of a wireless device according to an embodiment.

FIG. 2B shows power states of the wireless device according to an embodiment.

FIG. 6A shows a data signal according to an embodiment.

FIG. 6B includes a table showing properties of legacy fields of data signal according to an embodiment.

FIG. 7 shows field information for the contents of a Legacy Signal (L-SIG) field.

FIG. 8 illustrates Peak-to-Average Power Ratios (PAPR) for fields in a Legacy preamble.

FIG. 11A includes a first part of Table 1, which shows an optimized set of sequences for generating On-Off Keying (OOK) signals with low PAPR, according to an embodiment.

FIG. 11B includes a second part of Table 1.

FIG. 12 includes a table showing root indexes U for a Zadoff-Chu (ZC) sequence with a length of 13 for generating a symbol that provides good PAPRs, according to an embodiment.

FIG. 13 includes a table showing root indexes U for a ZC sequence with a length of 13 for generating a symbol that provides good PAPRs, according to another embodiment.

FIG. 14 illustrates Wake Up (WU) Packets according to an embodiment.

DETAILED DESCRIPTION

Figure 3A:
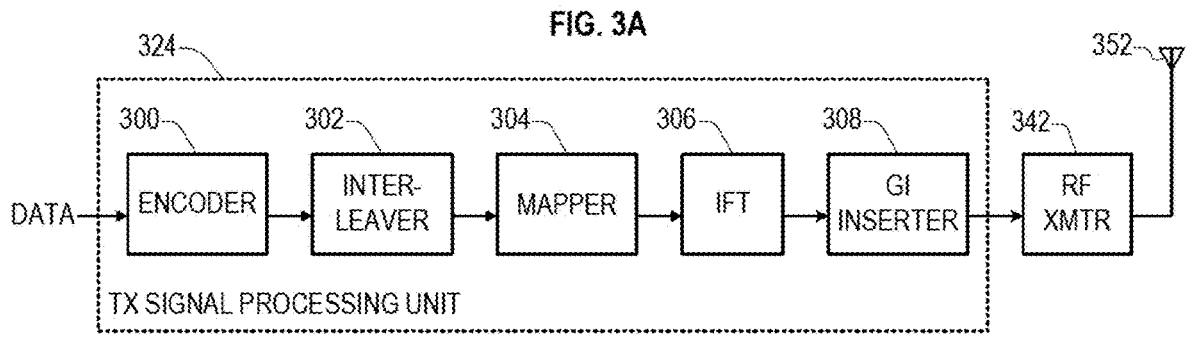
FIG. 3A illustrates components of a wireless device configured to transmit data, according to an embodiment.

The technology described herein relates generally to wireless networking. More particularly, the technology relates to improving battery life to battery powered wireless devices while providing a low latency response to service requests to the wireless device.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Networks (WLAN). In an 802.11 WLAN, the BSS provides the basic organizational unit and typically includes an Access Point (AP) and one or more associated stations (STAs).

The first BSS 100 includes an Access Point 102 (also referred to as AP) wirelessly communicating with first, second, and third wireless devices (or stations) 104, 106, and 108 (also referred to as stations STA1, STA2, and STA3, respectively). The wireless devices may each include a medium access control (MAC) layer and a physical (PHY) layer according to an IEEE 802.11 standard.

Although FIG. 1 shows the first BSS 100 including only the first to third stations STA1 to STA3, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA3 in the first BSS 100 using a single frame, or may simultaneously transmit information to two or more of the stations STA1 to STA3 in the first BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single MU-MIMO OFDMA frame.

The stations STA1 to STA3 may each transmit data to the AP 102 using a single frame, or transmit information to and receive information from each other using a single frame. Two or more of the stations STA1 to STA3 may simultaneously transmit data to the AP 102 using an Uplink (UL) OFDMA frame, an UL MU-MIMO frame, or an UL MU-MIMO OFDMA frame.

In another embodiment, the AP 102 may be absent and the stations STA1 to STA3 may be in an ad-hoc network.

FIG. 1 shows a wakeup (WU) transmission 112, an uplink (UL) transmission 114, and a down-link (DL) transmission 116 of the first BSS 100. The WU transmission 112 includes a WU packet addressed to the first station STA1 that is received by a Low Power Wake-Up Receiver (LP-WUR) of the first station STA1.

The WU transmission 112 operates to wake the first station STA1 out of a sleep mode. Once woken up, the first station STA1 may send the UL transmission 114, which may include a PS-Poll frame, to the AP 102 to indicate that the first station STA1 is awake. In response to receiving the UL transmission 114, the AP 102 may transmit the DL transmission 116 which may include user date for the first station STA1.

In other embodiment, the first station STA1 may not send the UL transmission 114 in response to being woken up, but may instead use its main RF transceiver to listen for the DL transmission 116. The first station STA1 may then send the UL transmission 114 in response to the DL transmission 116.

The WU packet of the WU transmission 112 includes a Legacy 802.11 preamble transmitted in OFDM and includes an LP-WUR signal. The Legacy 802.11 preamble provides coexistence with legacy stations and with stations that are not in sleep mode. Using the Legacy Short Training Field (L-STF), Legacy Long Training Field (L-LTF), and Legacy Signal (L-SIG) field of the Legacy 802.11 Preamble, the stations can detect the beginning of WU packet and determine the length of it. The WU packet contains a receiver address which could be single, multiple, or broadcast address.

Each of the stations STA1 to STA3 and the AP 102 includes a processor and one or more transceiver circuits, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations STA1 to STA4 and the AP 102 may be respectively implemented using hardware components, software components, or both.

The first AP 102 may be or include a WLAN router, a stand-alone Access Point, a WLAN bridge, a Light-Weight Access Point (LWAP) managed by a WLAN controller, and the like. In addition, a device such as a personal computer, tablet computer, or cellular phone may be configured to be able to operate as the AP 102, such as when a cellular phone is configured to operate as a wireless "hot spot."

Each of the stations STA1 to STA3 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards, but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and/or a subtype field included in a control field of the frame, as prescribed in the applicable standard.

FIG. 2A illustrates a schematic block diagram of a wireless device 200 according to an embodiment. The wireless or WLAN device 200 may be included in the AP 102 or any of the stations STA1 to STA4 in FIG. 1.

The WLAN device 200 may include a power control circuit 202 and first and second power domains 204 and 206. The power control circuit 202 may turn power on and off to the first power domain 204 and turn power on and off to the second power domain 206 in response to signals from one or more devices within the WLAN device 200.

In an embodiment, the power control circuit 202 may turn off the power to the first power domain 204 and turn on the power to the second power domain 206 when the WLAN device 200 is in a sleep mode. The power control circuit 202 may turn on the power to the first power domain 204 when a signal from a device in the second power domain 206 indicates that the WLAN device 200 should be woken up. The power control circuit 202 may turn off the power to the second power domain 206 in response to an indication that the WLAN device 200 is no longer in the sleep mode. The power control circuit 202 may turn on the power to the second power domain 206 in response to an indication that the WLAN device 200 is about to enter the sleep mode.

In an embodiment, the power control circuit 202 may place the first power domain 204 in a Doze state instead of turning off the power to the first power domain 204. In the Doze state, power control circuit 202 reduces a power supply voltage of the first power domain 204 to a standby voltage rather than turning the power off to the first power domain 204 in order to, for example, maintain an internal state of the circuits in the first power domain 204.

The first power domain 204 of the WLAN device 200 includes a baseband processor 210, a radio frequency (RF) transceiver 240, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The first power domain 204 may also include an application processor, a graphics processor, and the like.

The second power domain 206 of the WLAN device 200 includes a Low Power Wake-up Radio (LP-WUR) 208. The WLAN device 200 may also include an antenna unit 250 that is not in either of the first and second power domains 204 and 206.

FIG. 2B shows power states of the wireless device 200 according to an embodiment. In the illustrative embodiment, the wireless device 200 has four power states, but embodiments are not limited thereto.

In the SLEEP state, the first power domain 204 is turned off or placed in a Doze state and the second power domain 206 is turned on. In the SLEEP state, the LP-WUR 208 listens for a Wake Up (WU) packet addressed to the wireless device 200.

When the LP-WUR 208 receives a WU packet addressed to the wireless device 200, the LP-WUR 208 signals to the power control circuit 202 to wake up the wireless device 200. In response, the power control circuit 202 turns on the first power domain 204, placing the wireless device 200 in the WAKING UP state.

In an embodiment, the wireless device 200 has an AWAKE state controlled by a processor in the wireless device. When the wireless device 200 enters the AWAKE state, communications are performed through the RF transceiver 240, so there is no need to have the LP-WUR listening for WU packets, and the second power domain 206 may be turned off.

In an embodiment having the AWAKE state, the wireless device 200 has a PREPARING TO SLEEP state controlled by the processor in the wireless device. When the wireless device 200 is preparing to enter the SLEEP state, the second power domain 206 may be turned back on before the first power domain 204 is turned off, such as when, for example, a circuit in the first power domain 204 still has actions to perform to prepare for the SLEEP state after the second power domain 206 is turned on. When those actions are finished, the wireless device 200 may turn off the first power domain 204 and enter the SLEEP state.

In an embodiment without the AWAKE state, the second power domain 206 is never turned off.

The baseband processor 210 performs baseband signal processing, and includes a MAC processor 212 and a PHY processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2A, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
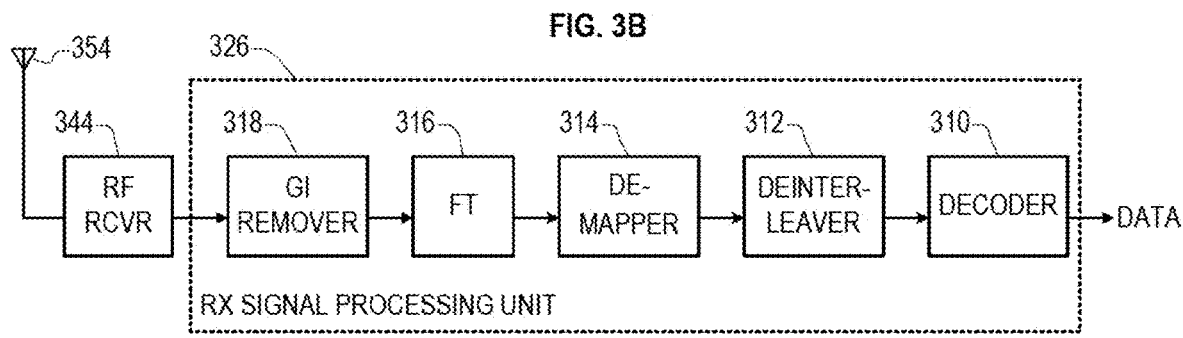
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2A, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

Figure 4:
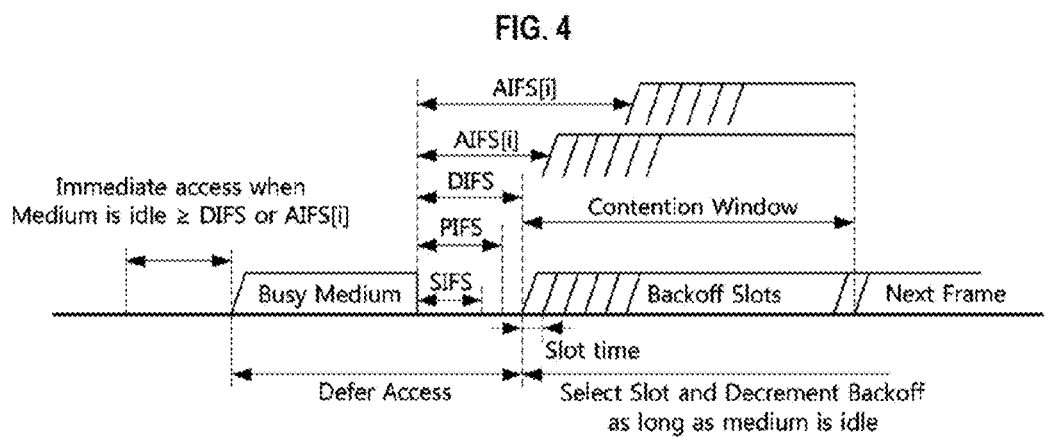
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
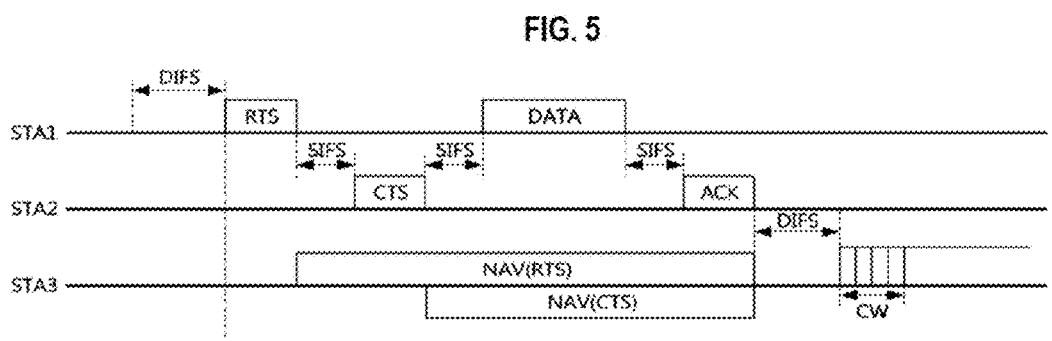
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+

SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA2 transmitting an ACK frame to acknowledge the successful reception of a frame by the recipient.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving PHY Protocol Data Units (PPDUs) that are compliant with the mandatory PHY specifications.

A PHY entity may provide support for 20 MHz, 40 MHz, 80 MHz, and 160 MHz contiguous channel widths and support for an 80+80 MHz non-contiguous channel width. Each channel includes a plurality of subcarriers, which may also be referred to as tones.

A PHY entity may define fields denoted as Legacy Signal (L-SIG), Signal A (SIG-A), and Signal B (SIG-B) within which some necessary information about PHY Service Data Unit (PSDU) attributes are communicated. For example, a High Efficiency (HE) PHY entity may define an L-SIG field, a HE Signal A (HE-SIG-A) field, and an HE Signal B (HE-SIG-B) field.

In order to support long range and low power (LRLP) data transmissions, the transmitted signal carrying a WU packet should have a low peak to average power ratio (PAPR) or similar metric (e.g., a low Cubic Metric (CM)). Additionally, the LRLP data transmission should be backward compatible with existing IEEE Std 802.11 systems. Backward compatibility can be obtained by using a legacy preamble as part of the LRLP data transmission.

FIG. 6A shows a data signal 600 according to an embodiment. The data signal 600 is in a 20 MHz channel and includes a Legacy Preamble and a WU Packet Payload.

The Legacy preamble includes a Legacy Short Training Field (L-STF) 602, a Legacy Long Training Field (L-LTF) 606, and a Legacy Signal (L-SIG) field 612; FIG. 6B shows some characteristics of these fields. The WU Packet Payload includes a WU preamble 618 and WU Data 620.

In an embodiment, the L-SIG field 612 may be transmitted using additional upper tones 622 and lower tones 624 (not used in the preceding portions of legacy preamble) at the edge of the bandwidth of the 20 MHz channel. The upper tones 622 may comprise two tones having respective indexes of 27 and 28, and the lower tones 624 may comprise two tones having respective indexes of −27 and −28. Since legacy devices do not expect or process these extra edge tones, they do not interfere with reception of the L-SIG field 612 by legacy devices.

The frequency bandwidth of the WU preamble 618 can be the same as the frequency bandwidth of the legacy preamble, or it can be narrower than the frequency bandwidth of the legacy preamble. In an embodiment, the frequency bandwidth of the WU preamble 618 can be narrower than the frequency bandwidth of the L-STF 602 or L-LTF 606 of the legacy preamble.

In an embodiment, the frequency bandwidth of the WU Data 620 can be narrower than the frequency bandwidth of the L-STF 602 or L-LTF 606 of the legacy preamble. In an embodiment, the frequency bandwidth of the WU Data 620 is the same as the frequency bandwidth of the WU preamble 618. In an embodiment, the frequency bandwidth of the WU Data 620 is narrower than the frequency bandwidth of the WU preamble 618.

When the WU Packet Payload adopts narrow-band design having a narrower bandwidth than the frequency bandwidth of the L-STF 602 or L-LTF 606 (e.g., when the L-LTF 606 uses 53 tones having indexes in the range −26 to 26, the WU Packet Payload may occupy only 13 of those tones), noise received on the tones that are not used in the WU Packet Payload may be mis-interpreted as signal where a receive level drops below a threshold (e.g., as a missed preamble), which might trigger 802.11n devices to incorrectly detect this PPDU as an 802.11n type PPDU and erroneously set the PHY-CCA.indication(IDLE). To prevent this, as shown in FIG. 6A, embodiments may include a 20 MHz OFDM symbol 614 having the same frequency bandwidth as the L-STF 602 or L-LTF 606, with tone spacing of 312.5 KHz, modulated using Binary Phase Shift Keying (BPSK), and having a of duration 4 us, after the L-SIG field 612 and before the narrow band portion of any WU Packet.

If the sequence of the OFDM symbol 614 is implementation-dependent, it may result in a high PAPR for the OFDM symbol 614. Higher PAPR of the OFDM symbol 614 may require reduced transmission power of the data signal 600, which may limit the ability of the WU Packet to propagate over the channel.

In an embodiment, in order to produce a low PAPR, the OFDM symbol 614 corresponds to a 4 µs L-STF sequence $S_{-26,26} = \sqrt{1/2} \cdot \{0, 0, 1+j, 0, 0, 0, -1-j, 0, 0, 0, 1+j, 0, 0, 0, -1-j, 0, 0, 0, -1-j, 0, 0, 0, 1+j, 0, 0, 0, 0, 0, 0, -1-j, 0, 0, 0, -1-j, 0, 0, 0, 1+j, 0, 0, 0, 1+j, 0, 0, 0, 1+j, 0, 0, 0, 1+j, 0, 0\}$.

In an embodiment, in order to produce a low PAPR, the OFDM symbol 614 correspond to a 4 µs L-LTF sequence $L_{-26,26} = 1, 1, -1, -1, 1, 1, -1, 1, -1, 1, 1, 1, 1, 1, 1, -1, -1, 1, 1, -1, 1, -1, 1, 1, 1, 1, 0, 1, -1, -1, 1, 1, -1, 1, -1, 1, -1, -1, -1, -1, -1, 1, 1, -1, -1, 1, -1, 1, -1, 1, 1, 1, 1$.

In another embodiment the OFDM symbol 614 corresponds to a repetition of the OFDM symbol making up the 4 μs L-SIG field 612 but without the extra tones 622 and 624. In another embodiment the OFDM symbol 614 corresponds to a repetition of the OFDM symbol making up the 4 μs L-SIG field 612 with the extra tones 622 and 624.

The WU Data 620 includes a Media Access Control (MAC) Header 626, an optional Frame Body 628, and a Frame Check Sum (FCS) 630. The MAC Header 626 has a fixed size and includes fixed size information, including a Frame Control field 632, an Address field 634 and a Type Dependent (TD) Control field 636. These fields are present in the MAC Header 626 regardless of the type of the Wake-Up packet.

The Frame body 628 may be present in a WU packet if needed to transmit specific information, and has a length that varies according to its purpose. In some WU Packets, the Frame Body 628 is omitted. The FCS 630 is a cyclic redundancy check used to determine whether the WU packet was received without errors.

The Frame Control field 632 may contain a Type subfield and/or a Subtype subfield to indicate different types (e.g., Wake-up packet to operate as a WUR beacon, a Wake-up packet to wake up a main radio, etc.). The Address field 634 may contain the identifier (e.g. a transmit address or a receive address, depending on the type of the Wake-up packet) of the Wake-up packet. The TD Control field 636 may contain control information that is type dependent (e.g., partial Time Synchronization Function (TSF) information in a WUR beacon).

Because the length of the Frame Body 628 may have a variable length and a LP-WUR only receives the narrow band portion of the WU packet, a control signal that can be used to determine the length of a Wake-up packet is included in the narrow band portion of the Wake-up packet. The control signal could be included in either WU preamble 618 or the MAC header 632. Depending on the location of the information on the length of the Frame Body 628, the Wake-up packet may need to include additional information, as will be discussed below.

FIG. 7 shows field information for the contents of an L-SIG field 700 of a legacy preamble. The L-SIG field contains a rate field, a reserved (R) field, a length field, a parity check bit (P) field, and the BCC signal tail field. The BCC signal tail field is always set to all zeros. The parity bit is set to the parity of the entire L-SIG contents. For example, if the number of 1's in the rate, reserved, and the length fields is even, the parity bit would be set to zero, and if the number of 1's in the rate, reserved, and the length fields is odd, the parity bit would be set to one.

FIG. 8 illustrates Cumulative Distribution Function (CDF) of the Peak-to-Average Power Ratio (PAPR) of the L-STF, L-LTF, and L-SIG OFDM symbols. Unlike the L-STF and L-LTF of the legacy preamble, which have each been designed to have a low PAPR, the L-SIG field has not been optimized to have a low PAPR.

In WUR transmissions (that is, transmissions intended to be received by WURs) it is advantageous for the transmitted signal (i.e., a WU Packet) to have low PAPR or similar metric. Additionally the WU Packet should be backward compatible to existing 802.11 systems. This backward compatibility can be obtained by using legacy preamble as part of the WU Packet. Based on the contents in L-SIG field of the legacy preamble, a non-intended receiver (that is, a receiver other than a WUR) can calculate the length of the received PPDU that includes the WU Packet.

Referring again to FIG. 6A, in an embodiment the L-SIG field 612 includes the extra tones 622 and 624 at the edge of the bandwidth (e.g., at subcarrier indices k=−28, −27, +27, +28). Since legacy devices do not expect or process the extra edge tones, they do not interfere with L-SIG field reception. In order to further reduce the PAPR of the L-SIG field 612, the extra 622 and 624 can be filled with a predetermined sequence that is a selected according to the contents of the L-SIG signal.

In order to facilitate the use of a simple design of the LP-WUR, the signals intended for reception by the LP-WUR may be based on on-off keying (OOK). This allows simple detectors, thereby reducing the power consumptions of the digital part of the LP-WUR. However, in order to keep a backwards compatibility with existing 802.11 devices, the signals intended for the LP-WUR are preceded with L-STF, L-LTF, and L-SIG field signals.

Figure 9:
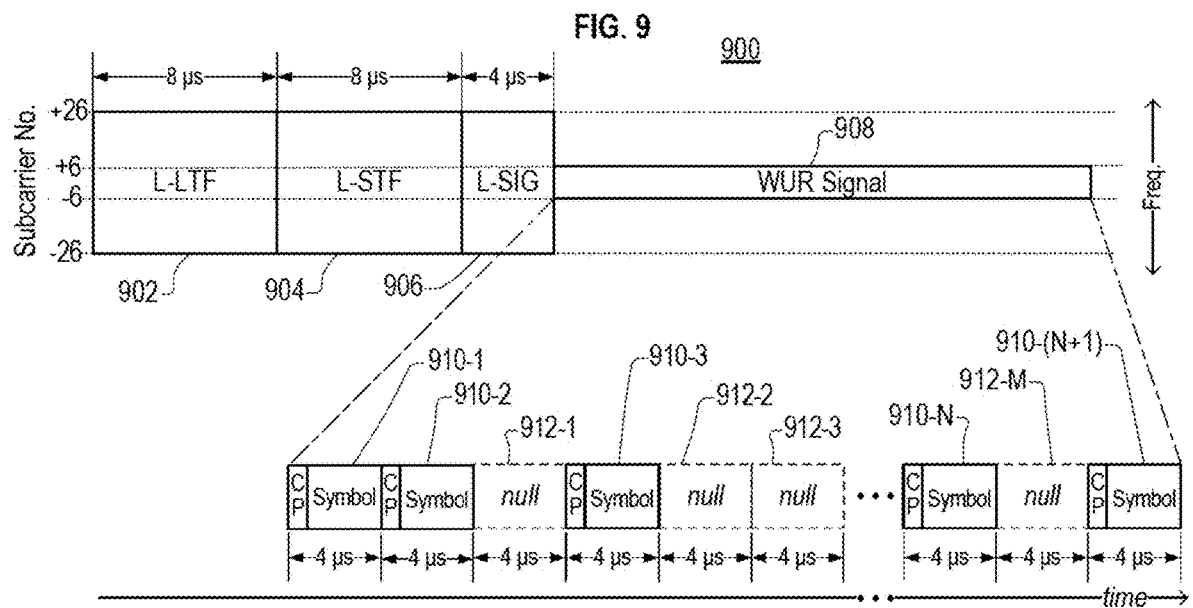
FIG. 9 illustrates transmission of a Wake-Up Receiver (WUR) signal in a Wake Up (WU) packet according to an embodiment.

FIG. 9 illustrates transmission of a WUR signal 908 (also called the WU Packet payload 908) in a WU packet 900 according to an embodiment. The WU packet 900 includes an L-STF 902, an L-LTF 904, and an L-SIG field 906 that all precede the WUR signal 908.

The WU Packet payload signal is transmitted by on-off keying of entire OFDM symbols. For example, in an embodiment, a value of 1 can be represented by transmission of an OFDM symbol, and a value of 0 can be represented by lack of signal during the potential OFDM symbol duration, as shown in FIG. 9. In such an embodiment, each potential OFDM symbol can represent 1 bit of information, and respective durations of the resulting On-Off Keying (OOK) bits is 4 us, but embodiments are not limited thereto.

Accordingly, the WUR signal 908 includes a first transmitted OFDM symbol 910-1 corresponding to a value of 1 for a first bit, a second transmitted OFDM symbol 910-2 corresponding to a value of 1 for a second bit, no transmission for a first null period 912-1 corresponding to a value of 0 for a third bit, a third transmitted OFDM symbol 910-3 corresponding to a value of 1 for a fourth bit, no transmission for a second null period 912-2 corresponding to a value of 0 for a fifth bit, no transmission for a third null period 912-3 corresponding to a value of 0 for a sixth bit, an $N^{th}$ transmitted OFDM symbol 910-N corresponding to a value of 1 for an $X^{th}$ bit, no transmission for an $M^{th}$ null period corresponding to a value of 0 for an $X+1^{th}$ bit, and an $N+1^{th}$ transmitted OFDM symbol 910-(N+1) corresponding to a value of 1 for an $X+2^{th}$ bit, wherein X=N+M−1.

Each OFDM symbol can be generated using the OFDM symbol generator by having a predefined sequence that is mapped to a subset of the subcarriers in the frequency domain.

Figure 10:
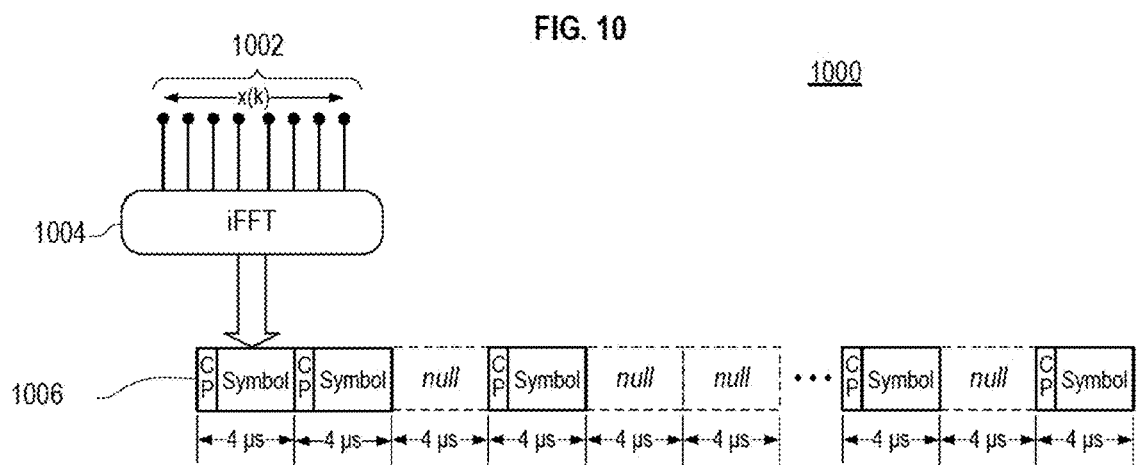
FIG. 10 illustrates a process of generating an OFDM symbol for use in On-Off keying (OOK) transmission according to an embodiment.

FIG. 10 illustrates a process 1000 of generating an OFDM symbol 1006 for use in OOK transmission according to an embodiment. A plurality of values x(k) are mapped to respective subcarriers k, where k has a range covering a subset 1002 of the available subcarriers, and the remaining subcarriers outside of the subset 1002 are given values of 0. In an embodiment, k ranges from −6 to 6.

The subcarriers are then converted to a time domain by an inverse Fast Fourier Transform (iFFT) process 1004 to create a corresponding time-domain OFDM symbol 1006. The sequence, x(k) of FIG. 10, which maps into one OFDM symbol, can be optimized to convey a single bit of OOK signal.

Figure 11A:
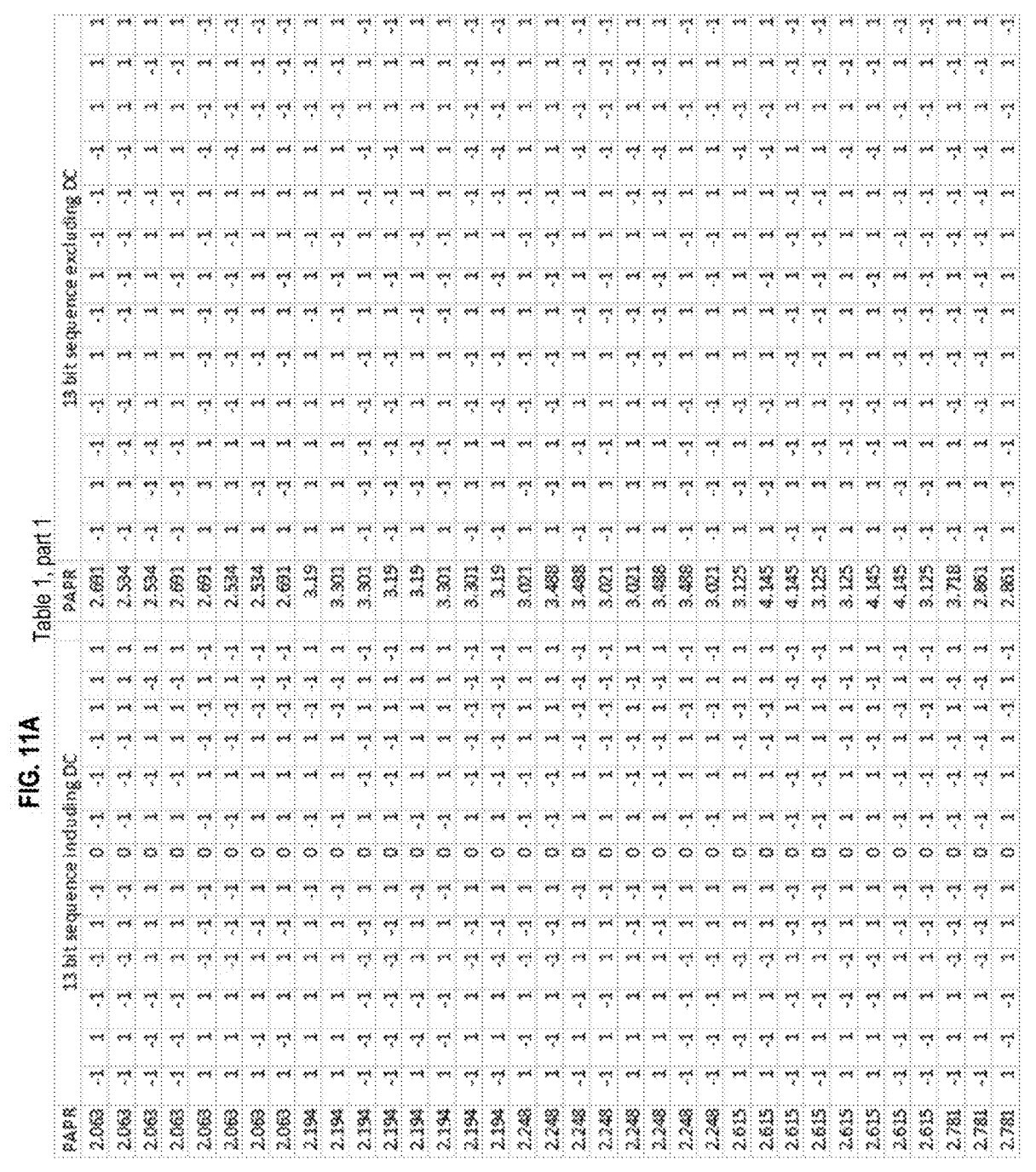
Figure 11B:
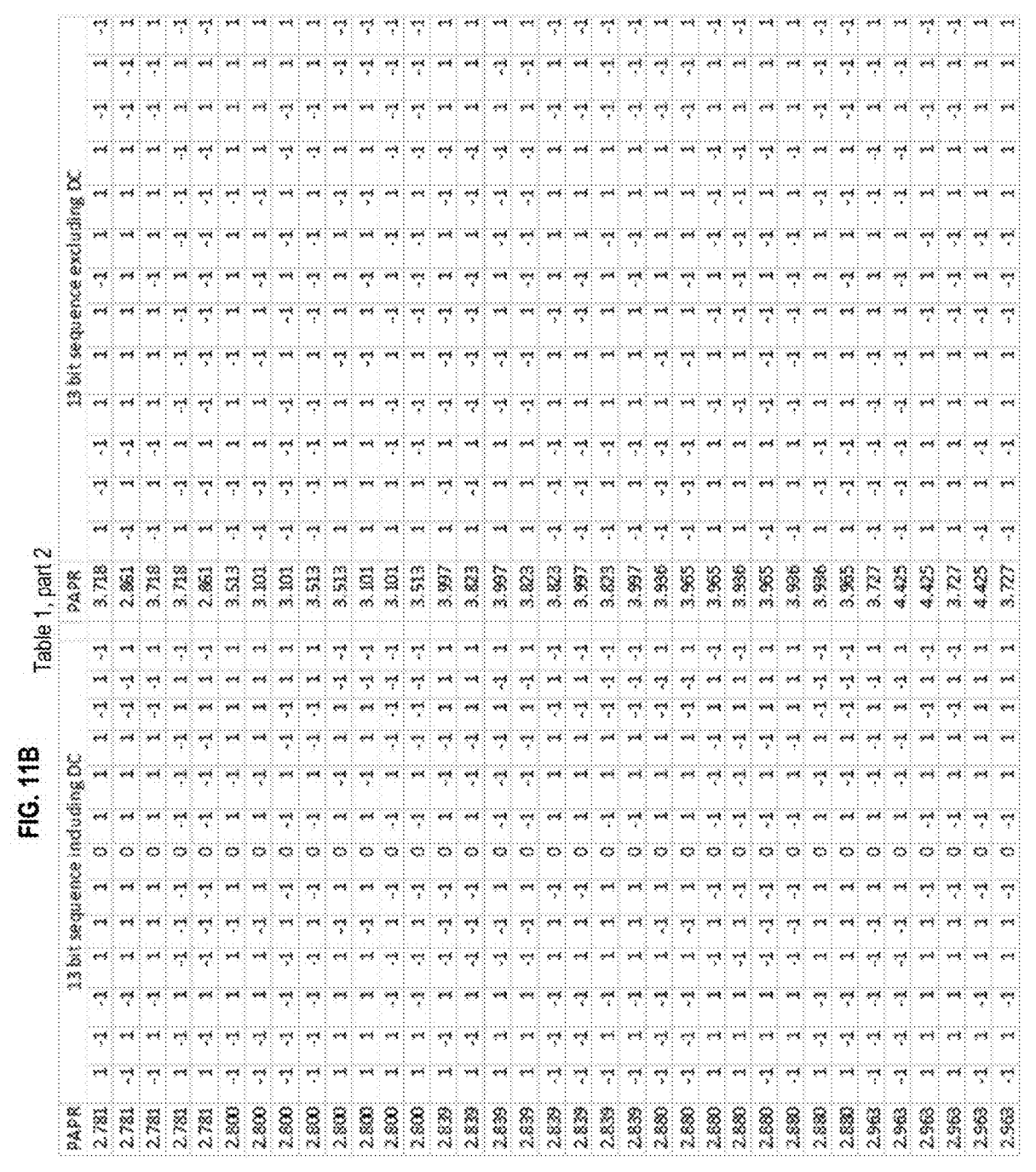

FIGS. 11A and 11B respectively include parts 1 and 2 of a table, Table 1, including an optimized set of sequences with a length of 13 according to an embodiment. To generate signals for OOK signaling, 1) a sequence is mapped to subcarriers having indexes from −6 to +6 of an OFDM symbol and 2) the sequence is mapped to an assigned RU in OFDMA. The sequences listed are base sequences for generating OOK signals for reception by Wake-Up Receivers (WURs). The first 8 sequences provide excellent PAPRs and therefore, make it possible to transmit the WUR OFDM symbols at increased power levels compared with the L-SIG or L-STF/L-LTF OFDM symbols in the legacy preamble. The 13-bit sequences excluding DC shown in Table 1 can be used in a OFDMA manner in an MU transmission (that is, for a WU packet sharing a 20 MHz bandwidth with other communications that use subcarriers not used by the WU packet payload) while the 13-bit sequence including DC can be transmitted in a Single User (SU) manner for a WU packet that is the sole user of a 20 MHz bandwidth.

An optimized set of sequences with a length of 13 for use as base sequences to generate OOK signals where 1) the sequence is mapped to subcarriers having indexes from −6 to +6 of an OFDM symbol or 2) the sequence is mapped to an assigned RU in an OFDMA symbol can be generated using a Zadoff-Chu (ZC) equation. Odd length ZC sequences can be mapped to subcarriers −Ns to +Ns. To avoid transmitting a signal in a DC subcarrier signal, which transmission may not be possible for radio utilizing direct conversion methods, the signal at 0 (i.e. DC subcarrier) may be nulled out. The nulling of the DC tone distorts the time domain constant envelope property of the ZC sequence, however, the time domain signal still exhibits good PAPR.

A 13-bit ZC sequence $x_u(k)$ excluding DC can be expressed as:

$$x_u(k) = e^{-j\pi \cdot u \cdot k \cdot (k+1)/N_{ZC}}, -\lfloor N_{ZC}/2 \rfloor \leq k \leq \lfloor N_{ZC}/2 \rfloor \quad \text{Equation 1}$$

A 13-bit ZC sequence $x_u(k)$ including DC can be expressed as:

$$x_u(k) = \begin{cases} e^{-j\pi \cdot u \cdot k \cdot (k+1)/N_{ZC}}, & -\lfloor N_{ZC}/2 \rfloor \leq k \leq \lfloor N_{ZC}/2 \rfloor \ \& \ k \neq 0 \\ 0, & k = 0 \end{cases} \quad \text{Equation 2}$$

where $N_{ZC}$ is the length of the sequence, u is the root index between 1 and ($N_{ZC}-1$) that is prime with respect to $N_{ZC}$, and k is the subcarrier index. For example, an OOK signal that spans 4 MHz can use the following parameters in a OFDM symbol with subcarrier spacing of 312.5 kHz: $N_{ZC}=13$, k=[−6, −5, −4, . . . , 4, 5, 6].

FIG. 12 includes a Table 2 listing root indexes U (corresponding to u in Equations 1 and 2) for a ZC sequence length of 13 (which is a prime number) that provides good PAPRs. A 13-bit sequence excluding DC generated according to one of the listed root indexes shown in Table 2 can be used in an OFDMA manner in an MU transmission (that is, for a WU packet sharing a 20 MHz bandwidth with other communications). A 13-bit sequence including DC generated according to one of the listed root indexes shown in Table 2 can be transmitted in a Single User (SU) manner for a WU packet occupying a full 20 MHz bandwidth. To minimize modification that might exist between generating 13-bit sequences including DC and 13-bit sequences excluding DC, values of U=7 or 6 may be used to provide a low PAPR comparable to the PAPR of the L-LTF sequence.

FIG. 13 includes a Table 3 showing PAPRs for values of a root index U for 13-bit sequences generated for $N_{ZC}=13$, k=[0, 1, . . . , 12] according to:

$$x_u(k) = e^{-j\pi \cdot u \cdot k \cdot (k+1)/N_{ZC}}, 0 \leq k \leq N_{ZC}-1. \quad \text{Equation 3}$$

These sequences can be used for OFDMA, in which case all sequences assigned at different locations (that is, at different subcarrier index offsets within the 20 MHz channel) are the same.

In another embodiment, an offset parameter a is used for different subcarrier index offsets in an OFDMA transmission:

$$x_u(k) = e^{-j\pi \cdot u \cdot k \cdot (k+1)/N_{ZC}}, a \leq k \leq a+N_{ZC}-1. \quad \text{Equation 4}$$

wherein k=[a, a+1, a+12], in which case sequences assigned at different location are cyclic shifted relative to each other. Regardless of the range of k, the ZC sequences generated according to Equation 4 provide the same PAPR.

To reduce the amount of power needed to decode a WU packet, the WU packet should have a simple structure and be transmitted using the fewest possible number of control information fields. Additionally each field should provide support for only the minimum number of options that must be supported. If on operation to be performed without any specific control information, unnecessary control information should be removed.

Usually information included in an L-SIG field provides the length of the packet containing the L-SIG field. For example, for a PPDU processed by a main radio, the length of the length of the PPDU may be determined using of the L-SIG RATE field (4 bits) and the L-SIG LENGTH field (12 bits) to calculate a number of OFDM data symbols in the PPDU. If the packet length information was communicated in the WU Packet payload using OOK in the same number of bits, the 16 bits require at least 64 μs (16 OFDM symbols×4 us) in the WU Packet payload to indicate the length of the WU Packet. Considering that the WU Packet should be a simple design to support the limited functionality required to wake up the main radio efficiently, it may unnecessarily increase the complexity of the WU radio to support a large number of different lengths of WU Packet given the limited purposes of the WU Packet.

Embodiments limit the number of different lengths that a WU packet can have. In embodiment, a length of a WU Packet is determined by selecting one out of a set of lengths associate with the purpose of the WU packet. In embodiments, a data rate of the WU packet payload may be used to determine the WU packet length. In embodiment, a type of the WU packet (such as a type indicated in a frame control field of a MAC header of the WU packet payload) may be used to determine the WU packet length. Furthermore, limiting the number of possible lengths of the WU packet may allow it to be transmitted with a lower PAPR.

In an embodiment, in order to reduce unnecessary complexity in the WU Packet, only control information supporting the predetermined purposes of the WU Packet should be supported. A first indication should be in the WU Packet to indicate a specific length among a set of allowed PPDU lengths, and each PPDU length should be predetermined in accordance with a specific purpose of the WU Packet.

In an embodiment, the first indication could be the control information indicating the data rate (e.g., an indication indicating one of $N_A$ kbps or $N_B$ kbps). In an example, in an illustrative embodiment wherein, for a given function of a WU Packet, a set of possible WU *Packet* lengths consists of $L_{AA}$ μs and $L_{BB}$ μs, the length of the WU Packet would be $L_{AA}$ when the first indication indicates the data rate is $N_A$ kbps, and would be $L_{BB}$ when the first indication indicates the data rate is $N_B$ kbps.

In an embodiment, the first indication could be the control information indicating the PPDU type (e.g., one of a WUR beacon (for a sanity check, not for waking up a main radio)

or a common WU Packet to wake up the main radio). For example, in an illustrative embodiment wherein a set of WU Packet lengths consists of $L_{CC}$ µs and $L_{DD}$ µs, the length of WU Packet would be $L_{CC}$ when the first indication indicates that the WU Packet includes a WUR beacon, and would be $L_{DD}$ when the first indication indicates that the WU Packet includes a common WU Packet for waking up a main radio.

The embodiments described above could be combined to reduce the PAPR of each OFDM symbol in the WU Packet.

FIG. 14 illustrates first and second Wake Up (WU) Packets 1400A and 1400B according to an embodiment. The WU Packets 1400A and 1400B each include a legacy preamble consisting of an L-STF 1404, an L-LTF 1406, and a first L-SIG field 1412. In an embodiment, an OFDM signal 1414 including a copy of the information in the L-SIG field 1412 may follow the L-SIG field 1412.

In an embodiment, one or more of the first L-SIG field 1412 and the OFDM signal 1414 may be transmitted using additional upper subcarriers 1422 and lower subcarriers 1424. In an embodiment, the sequence used to generate the upper subcarriers 1422 and lower subcarriers 1424 are determined according to the length of the WU Packet 1400A or 1400B, and is chosen to reduce the PAPR of the L-SIG field 1412 and the OFDM signal 1414.

In the first WU packet 1400A, the WU preamble 1418A includes a first indication that is set to a first state, and as a result, the length of the WU packet 1400A is 24+P1+D1 µs. In the second WU packet 1400B, the WU preamble 1418B includes a first indication that is set to a second state, and as a result the length of the WU packet 1400B is 24+P2+D2 µs. The set of possible lengths for a WU Packet comprises {(24+P1+D1), (24+P2+D2), . . . }. In an embodiment, P1 is the same as P2; in another embodiment P1 is different from P2.

Although FIG. 14 indicates that the first indication is in the WU preamble 1418A or 1418B, embodiments are not limited thereto. In an embodiment, the first indicator is in the WU Data 1420A or 1420B. A 13-bit sequence to be mapped into the subcarriers to produce the OFDM symbols of the WU Data 1420A or 1420B consists of a ZC sequence constructed using Equation 3 or Equation 4, above, and selected to have produce OFDM symbols with low PAPR.

In an embodiment in which a control signal indicating information corresponding to a length of WU packet is provided as part of the WU preamble 1418A or 1418B, and a predetermined sequence is used to generate upper and lower tones 1422 and 1424 in order to keep the PAPR of the L-SIG field 1412 low, the length of Wake-up packet may be limited to one of a small number of values.

In order to reduce the complexity of the operation of a WUR, the control signal indicates the specific information to indicate the length of the Wake-up packet from among the limited number of possible lengths. The control signal being set to a first state indicates a first size of the WU packet, and the control signal being set to a second state indicates a second size of WU packet, wherein the first size contains up to a $K_1$ number of specific information fields and the second size contains up to a $K_2$ number of specific information fields. Zero or more of the specific information fields may be included in a Frame body field of the WU packet.

The first size could consist of a $L_1$ number ($L_1 < K_1$) of specific information field(s) in addition to a first overhead field while the second size could consist of a $L_2$ number ($L_2 < K_2$) of specific information field(s) in addition to a second overhead field.

In an embodiment, the control signal may be positioned after an information field used for synchronization in the WU preamble 1418A or 1418B.

In an embodiment, the control signal may indicate information corresponding to a length of a Frame Body of the WU Data 1420A or 1420B.

In an embodiment, the control signal may indicate information corresponding to how many of the specific information fields are included in a Frame Body of the WU Data 1420A or 1420B.

In an embodiment, the control signal may indicate how many receive IDs are included in a Frame Body of the WU Data 1420A or 1420B.

In an embodiment, the specific information field may indicate a receive identifier (ID) or include a receive address field. In an embodiment, each receive ID may have a size of 1 byte. In another embodiment, each receive ID may have a size of 2 bytes.

In an embodiment, the first and second overhead fields could include random padding bits so that energy is maintained in the channel during transmission of the WU packet. In an embodiment, the first and second overhead fields may include a specific sequence that indicates that the field is not assigned to any STAs. In an embodiment, the first and second overhead fields may indicate there are no more STAs assigned by the WU packet after the field.

In an embodiment, every receive address field may be appended with a respective additional field that indicates whether it is the last receive address of the WU packet.

Figure 15:
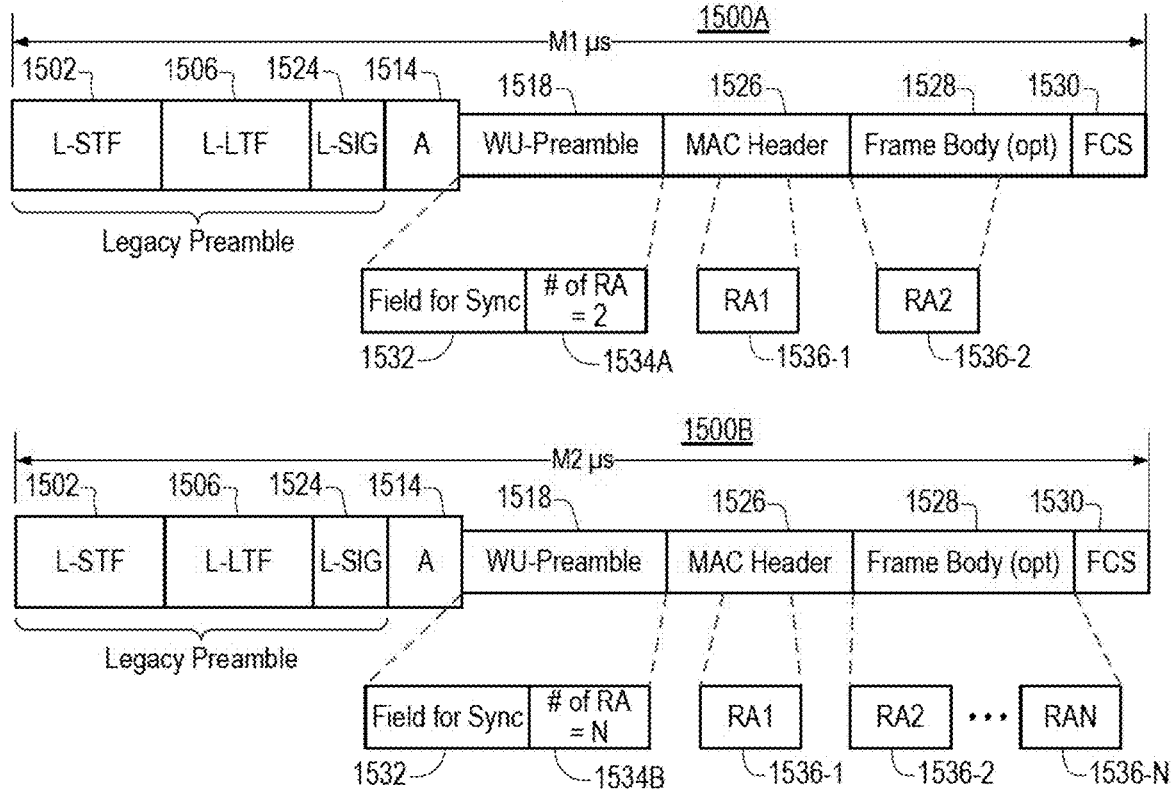
FIG. 15 illustrates WU Packets according to an embodiment.

FIG. 15 illustrates first and second WU Packets 1500A and 1500B according to an embodiment. Each WU Packets 1500A and 1500B include a legacy preamble comprising an L-STF 1502, an L-LTF 1506, an L-SIG field 1524, and a OFDM symbol 1514. The WU Packets 1500A and 1500B further comprise a WU preamble 1518 and WU Data comprising a MAC header 1526 and an FCS 1530. Optionally, each of the WU Packets 1500A and 1500B includes a Frame body 1528.

The WU preamble 1518 includes a field for synchronization 1532 and a NUM_RA indication 1534A (in WU Packet 1500A) or 1534B (in WU Packet 1500B) indicating the number of receive addresses (RA) in the WU payload. The lengths of the WU packets 1500A and 1500B may be determined based on the NUM_RA indications 1534A and 1534B, respectively. The length of the Wake-up packets 1500A and 1500B are each determined by comparing the number of respective RAs to a specific threshold.

For example, for a specific illustrative threshold such as 4, when two, three or four RAs are included in the WU Packet (such as the two RAs included in WU Packet 1500A) the length of the Wake-up packet is M1 us. When five, six, seven or eight RAs are including in the WU Packet (such as when N is five or more in WU Packet 1500B), the length of the Wake-up packet is M2 us, where M2 is greater than M1.

In an embodiment, when the NUM_RA indication of a WU Packet indicates that the WU Packet includes only one RA, the WU Packet does not include a Frame Body.

For example, the NUM_RA indication 1534A in WU Packet 1500A shown in FIG. 15 indicates that the WU Packet 1500A includes two receive addresses (RAs). The first RA 1536-1 is included in the MAC header 1526, and the second RA 1536-2 is included in the Frame Body 1528 (in which case the remainder of the Frame Body 1528 may be comprised of one or more overhead fields). The NUM_RA indication 1534B in WU Packet 1500B shown in FIG. 15 indicates that the WU Packet 1500A includes N receive addresses (RAs). The first RA 1536-1 is included in the MAC header 1526, and the second through $N^{th}$ RAs 1536-2 through 1536-N are included in the Frame Body 1528.

Figure 16:
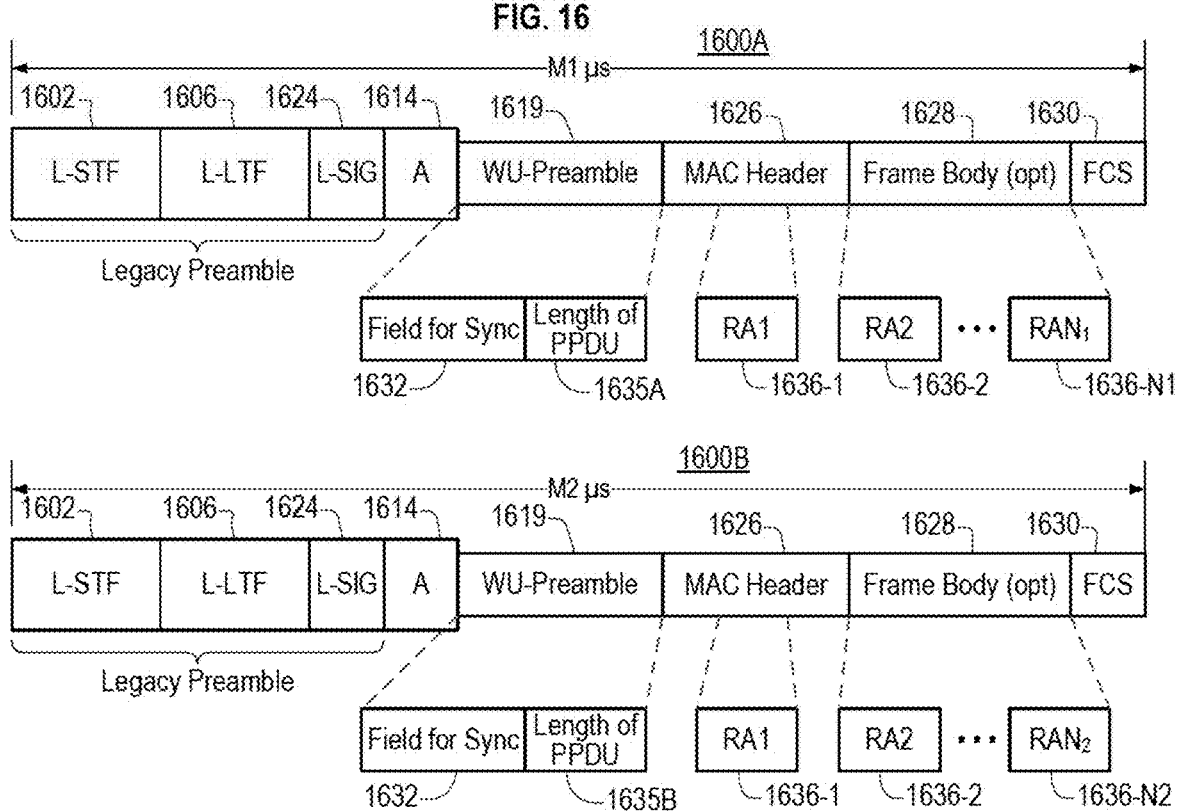
FIG. 16 illustrates WU Packets according to another embodiment.

FIG. 16 illustrates first and second WU Packets 1600A and 1600B according to another embodiment. Elements of FIG. 16 having reference characters of the form 16XX are similar to the corresponding elements of FIG. 15 having reference characters of the form 15XX, and descriptions thereof are omitted in the interests of brevity.

The WU Preamble 1619 of FIG. 16 is similar to the WU preamble 1518 of FIG. 15 except that instead of a NUM_RA indication, the WU Preamble 1619 includes a PPDU Length indication 1635A (in WU Packet 1600A) or 1635B (in WU Packet 1600B) indicating a length of the respective WU packets 1600A and 1600B. The PPDU Length indications 1635A and 1635B having value determined according to the number of STAs addressed in the respective WU packets 1600A and 1600B. For example, for the first WU Packet 1600A which include first through $N_1^{th}$ Receive Addresses (RAs) 1636-1 through 1636-$N_1$, and $N_1$ is less than or equal to a specific threshold of, for example, 4, the PPDU length field 1635A indicates the length of the first WU Packet 1600A is M1 µs. For the second WU Packet 1600B which include first through $N_2^{th}$ Receive Addresses (RAs) 1636-1 through 1636-$N_2$, and $N_2$ is greater than the specific threshold of 4, the PPDU length field 1635B indicates the length of the second WU Packet 1600A is M2 µs, where M2 is greater than M1.

In an embodiment, when there is only one assigned STA in a WU Packet, the frame body is not present, and the length of the WU Packet may be M0 µs, where M0 is less than M1. When there are two assigned STAs in a WU Packet, an RA may be included in the Frame Body 1528 along with zero or more overhead fields.

In an embodiments wherein a control signal is included in a WU Packet's payload, the control signal indicating information that may indicate a length of the Wake-up packet, a predetermined sequence may be used to modulate additional subcarriers outside of the L-SIG field of the corresponding legacy preamble, as shown in FIGS. 6A and 14, to reduce the PAPR of the L-SIG field, and the length of the Wake-up packet is likely to be limited.

In order to reduce the complexity of the operation of WUR, the control signal indicates the specific information to indicate a limited length of the Wake-up packet. When the control signal is set to a first state, it indicates a first size of the Wake-up packet. When the control signal is set to a second state, it indicates a second size of the Wake-up packet. The first size contains up to a $K_1$ number of specific information fields and the second size contains up to a $K_2$ number of specific information fields. One of the specific information fields may be in a MAC header of the WU packet payload. One or more of the specific information fields may be in a Frame body field of the WU packet payload.

In an embodiment, the first size consists of a $L_1$ number ($L_1 < K_1$) of specific information field(s) in addition to a first overhead field, and the second size consists of a $L_2$ number ($L_2 < K_2$) of specific information field(s) in addition to a second overhead field.

In an embodiment, the control signal could be positioned in a Frame Control field.

In an embodiment, the control signal indicates information corresponding to a length of a Frame Body.

In an embodiment, the control signal indicates information corresponding to how many specific information fields are included in the Frame Body. The specific information field may indicate a receive ID, where a size of the receive ID may be one byte or two bytes.

In an embodiment, the first and second overhead fields could be occupied with random padding bits to prevent energy from being lost in the channel in the middle of the Wake-up packet.

In an embodiment, the control signal indicates how many receiver IDs are included in the Frame Body.

In an embodiment, an overhead field could be a specific sequence to indicate that the overhead field is not assigned to any STAs. In another embodiment, an overhead field could indicate there is no more STAs assignments in the Wake-up packet after the field.

In an embodiment, every receive address field could be appended with an additional field to indicate whether that receive address field is the last receive address (which may be a receive ID) of the Wake-up packet.

In an embodiment, a WU Packet includes a Cyclic Redundancy Check (CRC) field or other type of field useable to determine whether the control signal of the WU packet is correct or not. The CRC field may could be positioned after a field of the WU Packet that includes the control signal.

In an illustrative embodiment, the CRC field comprises a 1-bit parity check bit, which may be enough depending on the position. The CRC field being in the middle of the WU packet payload allows a receiving device to determine the correctness of the control signal before reaching the FCS at end the end of the WU packet, thus eliminating the need to decode the whole packet to verify that a RA has a valid address.

Figure 17:
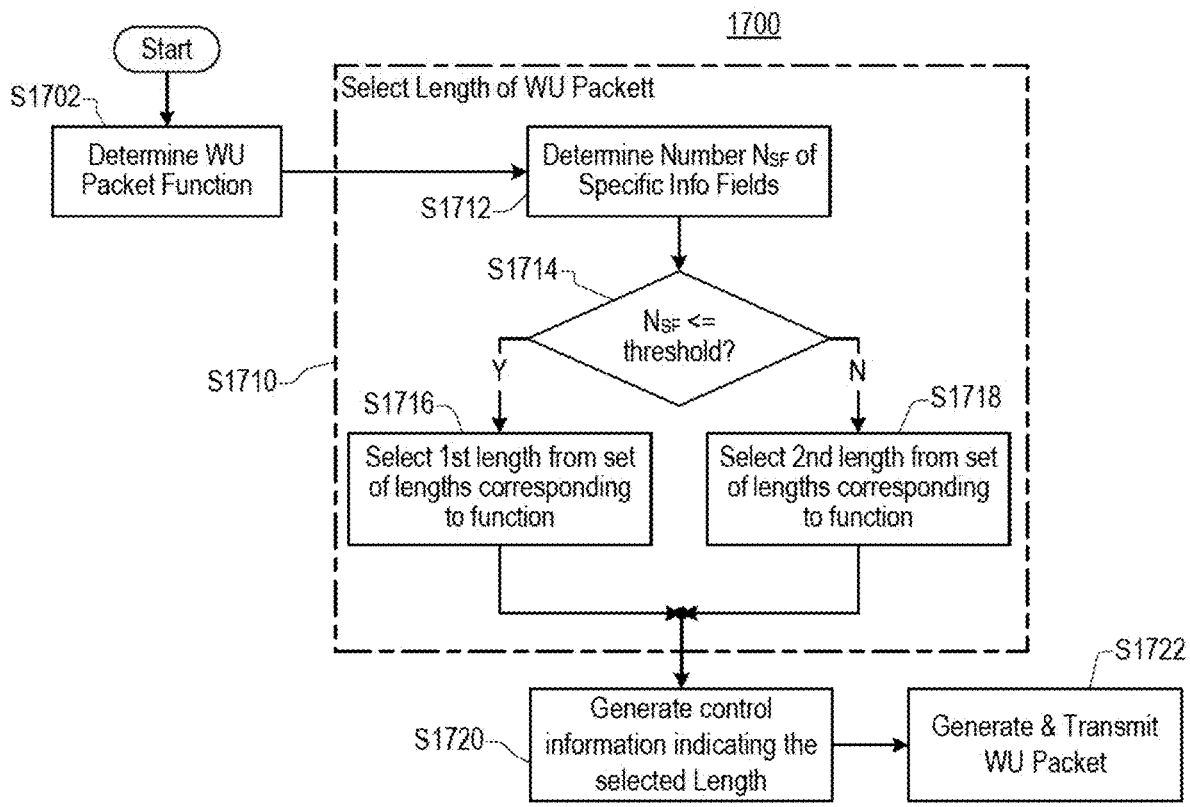
FIG. 17 illustrates a process for transmitting a WU Packet according to an embodiment.

FIG. 17 illustrates a process 1700 for transmitting a WU Packet according to an embodiment. The process 1700 may be performed by a wireless device such as the AP 102 of FIG. 1, but embodiments are not limited thereto.

At S1702, the process 1700 determines a function of a Wake-Up (WU) Packet that is to be transmitted. The function may be, for example, to operate as a WU beacon, or to wake up a main radio of one or more wireless devices.

At S1710, the process 1700 selects a length for the WU packet. The length is selected according to the function of the WU Packet. In an embodiment, the process 1700 selects the lengths as described below with respect to S1712 through S1718, but embodiments are not limited thereto.

At S1712, the process 1700 determines a number $N_{SF}$ of specific information fields to be included in the WU Packet. In an embodiment, the specific information fields correspond to addresses, which may include a transmitter address, one or more receiver addresses, or both, depending on the type of the WU packet. In an embodiment, the specific information fields correspond to receiver identifiers.

At S1714, the process 1700 compares the number $N_{SF}$ of specific information fields to a predetermined threshold. In response to determining that the number $N_{SF}$ of specific information fields is less than or equal to the predetermined threshold, at S1714 the process 1700 proceeds to S1716; otherwise, at S1714 the process 1700 proceeds to S1718.

At S1716, the process 1700 selects a first length in a predetermined set of lengths corresponding to the function of the WU Packet as the length of the WU Packet. The process 1700 then proceeds to S1720.

At S1718, the process 1700 selects a second length in a predetermined set of lengths corresponding to the function of the WU Packet as the length of the WU Packet. The process 1700 then proceeds to S1720.

At S1720, the process 1700 generates control information that can be used to determine the selected length of the WU Packet. For example, in an embodiment wherein the length of the WU packet is selected according to the number $N_{SF}$ of specific information fields, the control information may indicate the number $N_{SF}$ of specific information fields, but embodiments are not limited thereby.

At S1722, the process 1700 generates the WU packet. The WU packet may include a legacy preamble and a WU payload. The WU payload may include an indication of the function of the WU packet and the control information generated at S1720. The process 1700 then transmits the WU Packet. In an embodiment, transmitting the WU packet includes transmitting the legacy preamble before transmitting the WU payload.

Figure 18:
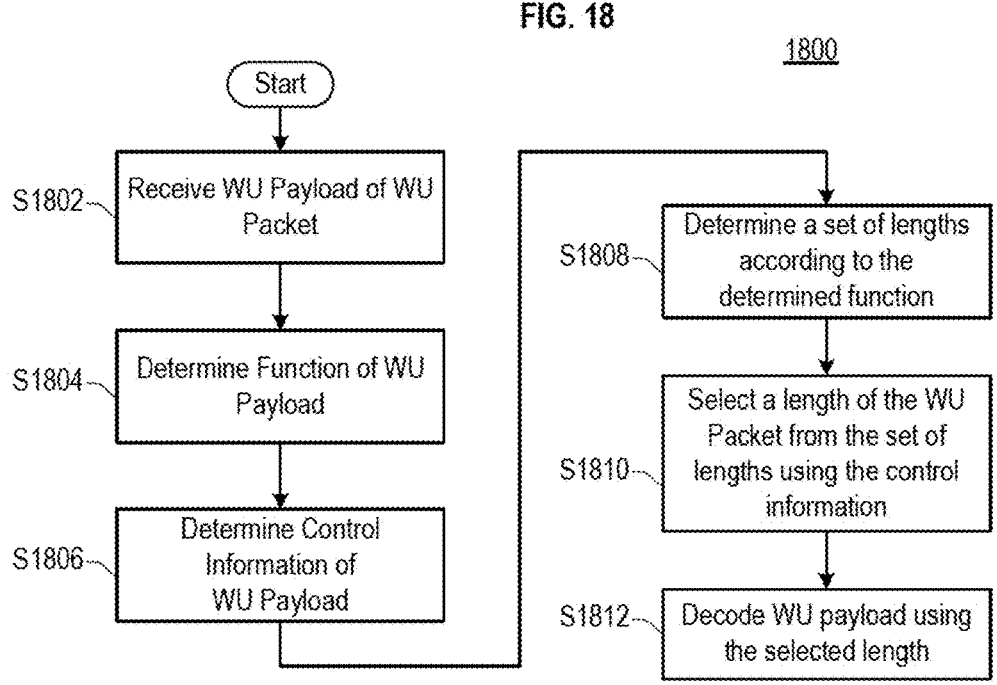
FIG. 18 illustrates a process for receiving a WU Packet according to an embodiment.

FIG. 18 illustrates a process 1800 for receiving a WU Packet according to an embodiment. The process 1800 may be performed by a Low-Power Wake-Up Receiver (LP-WUR) of a wireless device such as the LP-WUR 208 of WLAN device 200 of FIG. 2A, but embodiments are not limited thereto.

At S1802, the process 1800 receives a WU payload of a WU packet. The WU payload may be received by receiving an On-Off Keyed (OOK) signal transmitted after a legacy preamble, wherein the legacy preamble was transmitted using OFDM on a first bandwidth (such as a 20 MHz bandwidth), and the OOK signal was transmitted on a second bandwidth less than and included in the first bandwidth (such as a 4 MHz bandwidth).

At S1804, the process 1800 determines a function of the WU payload using an indication in the WU payload. In an embodiment, the indication is included in a MAC header of WU Data included in the WU payload after a WU preamble.

At S1806, the process 1800 determines control information of the WU payload. In an embodiment, the control information is included in the WU preamble included in the WU payload before the WU Data. In an embodiment, the control information is included in the WU preamble after a synchronization field.

At S1808, the process 1800 determines a set of predetermined lengths corresponding to the function of the WU Packet determined at S1804. For example, in an embodiment, when the WU packet functions as a WU beacon, the set of lengths may include first and second predetermined lengths, when the WU packet functions to wake up one or more main radios, the set of predetermined lengths may include third and fourth predetermined lengths, and therefor when the function of the WU Packet determined at S1804 indicates that the WU packet functions to wake up one or more main radios, the determined set of predetermined lengths consists of the third and fourth predetermined lengths.

At S1810, the process 1800 selects, using the control information, a length of the WU Packet from the determined set of predetermined lengths of S1808. In an example embodiment, when the control information indicates a value less than or equal to a predetermined threshold, the process 1800 selects a first value in the determined set of predetermined lengths as the length of the WU packet, and when the control information indicates a value greater than the predetermined threshold, the process 1800 selects the second value in the determined set of predetermined lengths as the length of the WU packet.

At S1812, the process 1800 decodes the WU payload according to the function of the WU packet determined at S1804, the control information determined at S1806, and the length of the WU packet determined at S1810.

Embodiments operate to permit efficient communication and determination of a length of a WU packet by a LP-WUR in a Wireless Local Area Network (WLAN).

Embodiments operate to communicate a length of a WU packet through an indication of the function of the WU Packet and a control indication (such as a number of a specific field) each of which is included in a WU Payload of the WU Packet. Embodiments have a small number of possible states (for example 2 or 4) for one or more of the indication of the function and the control indication, and therefore indicate only a small number of lengths. For example, for WU packets having a given function (that is, of a particular type), the control indication may be used to select one of only two allowed lengths for WU Packets having that function.

The solutions provided herein have been described with reference to a wireless LAN system; however, it should be understood that these solutions are also applicable to other network environments, such as cellular telecommunication networks, wired networks, etc.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random-access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method performed by a wireless device, the method comprising:

determining, by the wireless device, a function of a Wake-Up (WU) Packet;

selecting, by the wireless device, a length corresponding to a total length of the WU Packet from a predetermined set of lengths corresponding to the function;

generating, by the wireless device, the WU Packet having the selected length, generating the WU packet including:

generating a Legacy preamble having a first bandwidth; and generating a WU payload having a second bandwidth included within the first bandwidth, the WU payload including an indication of the function of the WU Packet and a control indication usable to select the length from the predetermined set of lengths corresponding to the function;

transmitting, by the wireless device, the WU packet, including:

transmitting the Legacy preamble on the first bandwidth; and transmitting the WU payload on the second bandwidth after transmitting the Legacy preamble.

2. The method of claim 1, wherein the control indication indicates a number of specific information fields in the WU payload, and wherein selecting the length of the WU Packet from the predetermined set of lengths corresponding to the function comprises:

selecting a first length from the predetermined set of lengths corresponding to the function in response to the control indication indicates a number of specific information fields less than or equal to a predetermined threshold value; and selecting a second length greater than the first length from the predetermined set of lengths corresponding to the function in response to the control indication indicates a number of specific information fields greater than a predetermined threshold value.

3. The method of claim 2, wherein the specific information fields include address fields.

4. The method of claim 2, wherein the specific information fields include receiver identifier fields.

5. The method of claim 2, further comprising appending an additional field to each specific information field, the additional field indicating whether the corresponding specific information field is the last specific information field in the WU packet.

6. The method of claim 2, further comprising:

determining a minimum length required to communicate the indicated number of specific information fields in the WU payload; and including in the WU payload one or more overhead fields in response to the minimum length being less than the selected length, the one or more overhead fields to maintain energy in a channel when the WU payload is transmitted.

7. The method of claim 6, wherein a value of an overhead field of the one or more overhead fields indicates that the overhead field is not assigned to a station.

8. The method of claim 6, wherein a value of an overhead field of the one or more overhead fields indicates that there are no specific information fields after the overhead field.

9. The method of claim 2, wherein generating the WU payload comprises:

generating a WU preamble; and generating a WU Data for transmission after the WU preamble, the WU data including a Media Access Control (MAC) header and a Frame Check Sum (FCS), wherein the MAC header includes the indication of the function of the WU Packet.

10. The method of claim 9, wherein generating the WU Data comprises including a Frame Body between the MAC header and the FCS if and only if the control indication indicates that the number of specific information fields is greater than one.

11. The method of claim 9, wherein the WU preamble includes the control indication.

12. The method of claim 1, wherein the Legacy preamble includes a Legacy Short Training field (L-STF), a Legacy Long Training Field (L-LTF), and a Legacy Signal (L-SIG) Field, and further comprising transmitting a sequence for reducing a Peak-to-Average Power Ratio (PAPR) of the L-SIG field on one or more additional subcarriers of the first bandwidth, the additional subcarriers having index numbers outside a range of the index numbers of the subchannels used to transmit the L-SIG field.

13. A method performed by a wireless device, the method comprising:

receiving, by the wireless device, a Wake-Up (WU) payload included in a WU Packet, the WU packet including a Legacy preamble before the WU payload;

determining, by the wireless device from the WU payload, a function of the WU Packet;

determining, by the wireless device from the WU payload, a control indication;

determining, by the wireless device, a length of the WU Packet corresponding to a total length of the WU Packet by selecting, using the control indication, the length of the WU Packet from a predetermined set of lengths corresponding to the function of the WU packet; and decoding, by the wireless device using the determined length of the WU packet, the WU payload, wherein the Legacy preamble has a first bandwidth, and wherein the WU payload has a second bandwidth included within the first bandwidth.

14. The method of claim 13, wherein the control indication indicates a number of specific information fields in the WU payload, and wherein selecting the length of the WU Packet from the predetermined set of lengths corresponding to the function comprises:

selecting a first length from the predetermined set of lengths corresponding to the function in response to the control indication indicates a number of specific information fields less than or equal to a predetermined threshold value; and selecting a second length greater than the first length from the predetermined set of lengths corresponding to the function in response to the control indication indicates a number of specific information fields greater than a predetermined threshold value.

15. The method of claim 14, wherein the specific information fields include address fields or receiver identifier fields.

16. The method of claim 14, wherein a corresponding additional field is appended to each specific information field in the WU payload, and further comprising determining, using an additional field of a specific information field, whether the specific information field is the last specific information field in the WU packet.

17. The method of claim 14, wherein the WU payload includes one or more overhead fields configured to maintain energy in a channel during the transmission of the WU payload.

18. The method of claim 17, further comprising determining, using a value of an overhead field of the WU payload, that the overhead field is not assigned to a station or that there are no specific information fields after the overhead field.

19. The method of claim 14, wherein receiving the WU payload comprises:
- receiving a WU preamble; and
- receiving a WU Data after receiving the WU preamble, the WU data including a Media Access Control (MAC) header and a Frame Check Sum (FCS),
- wherein the MAC header includes the indication of the function of the WU Packet.

20. The method of claim 19, wherein the WU preamble includes the control indication.

* * * * *